(12) United States Patent
Borg et al.

(10) Patent No.: US 7,475,542 B2
(45) Date of Patent: Jan. 13, 2009

(54) PYROTECHNIC ACTUATOR FURNISHED WITH A PRESSURE REGULATOR MEMBER

(75) Inventors: Evrard Borg, Martignas sur Jalle (FR); Eric Laspesa, Six Fours les Plages (FR); Jean-Paul Nadeau, Ollioules (FR)

(73) Assignee: SNPE Materiaux Energeriques, Paris (FR)

( * ) Notice: Subject to any disclaimer, the term of this patent is extended or adjusted under 35 U.S.C. 154(b) by 203 days.

(21) Appl. No.: 11/386,392

(22) Filed: Mar. 22, 2006

(65) Prior Publication Data
US 2006/0213191 A1    Sep. 28, 2006

(30) Foreign Application Priority Data
Mar. 24, 2005   (FR) .................................. 05 02905

(51) Int. Cl.
*F01B 29/08*    (2006.01)
(52) U.S. Cl. ............................... 60/636; 60/637; 60/638
(58) Field of Classification Search ............ 60/632–637
See application file for complete search history.

(56) References Cited

U.S. PATENT DOCUMENTS

| | | | | |
|---|---|---|---|---|
| 2,768,375 A | * | 10/1956 | Catlin | ........................... 227/11 |
| 2,857,889 A | * | 10/1958 | Stott et al. | ..................... 60/638 |
| 3,686,858 A | * | 8/1972 | Termet | ......................... 60/638 |
| 3,892,073 A | * | 7/1975 | Plantif et al. | .................. 60/635 |
| 4,815,295 A | * | 3/1989 | Narum | ........................ 60/632 |
| 7,051,528 B2 | * | 5/2006 | Daunas | ........................ 60/638 |

FOREIGN PATENT DOCUMENTS

| | | |
|---|---|---|
| CH | 568 868 | 11/1975 |
| EP | 0 550 321 | 7/1993 |
| FR | 2 824 875 | 11/2002 |
| FR | 2 848 950 | 6/2004 |
| FR | 2 857 421 | 1/2005 |

* cited by examiner

*Primary Examiner*—Hoang M Nguyen
(74) *Attorney, Agent, or Firm*—Hamre, Schumann, Mueller & Larson, P.C.

(57) ABSTRACT

The invention relates to a constant force pyrotechnic actuator comprising a pyrotechnic gas generator, a body, a piston capable of moving in the said body under the effect of the gases emitted by the generator, and a pressure regulator member situated inside the piston, the said piston having a front face traversed by a duct making it possible to place in communication the space separating the gas generator and the said piston, and an inner space in which the regulator member is housed. Within said actuator, the piston is extended by a hollow push rod terminating in an enlarged head, the said head having gas discharge ducts, and the inner space of the said rod is in communication with the inner space of the piston in which the regulator member is housed.

11 Claims, 4 Drawing Sheets

PYROTECHNIC ACTUATOR FURNISHED WITH A PRESSURE REGULATOR MEMBER

The technical field of the invention is that of pyrotechnic actuators comprising a piston and having an essential function of exerting a pressure for moving an object by causing the piston to emerge. The pyrotechnic actuators according to the invention are particularly suitable for safety systems used in motor vehicles and intended, for example, to damp the movement of certain parts that have been placed in movement during a mechanical impact of the motor vehicle with an external element, such as for example a seat belt, the front fender of the vehicle, the steering column or the bonnet of the vehicle in the case of a frontal collision between the vehicle and a pedestrian.

Pyrotechnic actuators making use of a piston have already been the subject of several patent applications.

Mention can be made of patent EP 0 550 321 which describes a damped stroke pyrotechnic jack that can be used in any type of energy absorption system. This jack comprises a pyrotechnic gas generator, a piston, a pyrotechnic materials combustion chamber and a back-pressure chamber and an intermediate chamber included between the said combustion chamber and one end of the piston. A duct connects the intermediate chamber to the back-pressure chamber. The gases emitted by the generator pressurize the intermediate chamber to oppose the movement of the piston and thus damp its stroke, a portion of the said gases being routed through the duct towards the back-pressure chamber.

Patent application FR 2 824 875, for its part, relates to a pyrotechnic actuator having a body, a piston, and a retention washer of the said piston in the said body. Depending on the initial position of the piston in the body, the actuator may either exert a pressure on an object by causing the said piston to emerge from the said body, or release a mechanical part by causing the piston to enter the said body.

Mention may also be made of patent application FR 2 857 421 which relates to a pyrotechnic actuator making use of a mechanical pressure regulating device in the slide chamber of the piston, making it possible to control the amplitude of movement of the said piston. In this manner, the pyrotechnic actuator has a variable pressure effect or even a programmable stroke and may therefore be suitable for a plurality of configurations requiring a greater or lesser movement of the piston.

Finally, it is possible to point out patent FR 2 848 950 whose subject is a seat belt pretensioner in a motor vehicle, operating on the basis of a pyrotechnic actuator making use of a pressure piston. The said actuator has a constant force thanks to a pressure limiter member placed outside the said actuator.

None of the pyrotechnic actuators described in these patents is specially designed with the intention of having a reduced space requirement. The pyrotechnic actuators according to the invention, which have the possibility of operating at constant force thanks to the addition of a mechanical pressure regulator member, have the particular feature of having the said regulator member inside the piston. In this manner, the problem resolved by the pyrotechnic actuators according to the invention is to have a uniform and regular piston stroke, with constant force, without untimely jolts, while providing a reduced space requirement, which is particularly sought-after for motor vehicles in which the spaces are usually restricted.

The subject of the present invention is a constant force pyrotechnic actuator comprising a pyrotechnic gas generator, a body, a piston capable of moving in the said body under the effect of the gases emitted by the generator and a pressure regulator member, characterized in that the said regulator member is situated inside the piston.

Preferably, the regulator member is a mechanical member involving several solid parts.

According to one embodiment of the invention, the gas generator is situated at one of the two ends of the body and the piston is capable of sliding hermetically in the said body, the outer surface of the piston being in contact with the inner surface of the body.

Advantageously, the regulator member comprises a stopper in contact with a prestressed member. Preferably, the stopper is a solid part made to move under the effect of the gases emitted by the pyrotechnic generator.

Advantageously, the piston and the stopper are coaxial and can move independently of one another in the same direction along the body, the piston in the said body and the stopper in the said piston.

Preferably, the piston has a front face traversed by a duct making it possible to place in communication the space separating the gas generator and the said piston, and an inner space of the piston in which the regulator member is housed.

Advantageously, the front face of the piston is transverse relative to the axis of the body of the actuator, and the prestressed member exerts a pushing force on the stopper to hold it against the duct. Since the piston slides hermetically in the body, the gases emitted by the gas generator may escape only through the piston duct. Preferably, the prestressed member consists of a coil spring.

Advantageously, the stopper consists of a ball.

Preferably, longitudinal splines are made inside the piston to allow the gases, once they have pushed the ball away from the duct, to pass through the said piston.

Advantageously, the stopper is a regulator piston having a conical segment whose smallest diameter part forms one end of the said stopper, making it possible to close off the duct of the front face of the piston.

Preferably, the piston has a rear face that is opposite to the front face, the said rear face having gas discharge slots to allow the said gases, that have pushed away the regulator piston, to pass through the piston of the actuator. Advantageously, the discharge slots are represented by arcs of a circle drawn around one and the same circle.

According to another embodiment of the invention, the regulator piston has a central body around which a plurality of fins is placed so as to allow the gases to pass once they have pushed away the said regulator piston from the opening. Specifically, the spaces between the fins form passageways for the gases once the regulator piston has been pushed away from the duct.

Advantageously, the regulator piston has four fins evenly spaced around the said body.

Advantageously, the piston is extended by a hollow push rod ending in an enlarged head, the said head having gas discharge ducts, and the inner space of the said rod is in communication with the inner space of the piston in which the regulator member is housed. In this manner, the gases that have entered the piston thanks to the pressure regulator member expand inside the rod and are subsequently discharged from the actuator by means of the discharge ducts of the enlarged head. This expansion of the gases makes it possible in particular to attenuate the noise when the said actuator is operating.

Preferably, the gas generator comprises a pyrotechnic charge and a system for igniting the said charge.

The pyrotechnic actuators according to the invention have the advantage of having a very small space requirement because the pressure regulator member is totally included in the actuator piston. The said actuators are therefore perfectly suited to the onboard safety devices, being given little space but having to be effective and reliable. In addition, because of the great variability of the pyrotechnic compositions that may be used in the actuators according to the invention, the said actuators may have a multiplicity of features in terms of reaction speed, gas flow produced and force delivered that makes them adaptable to a large number of configurations.

There follows a detailed description of three embodiments of the invention with reference to FIGS. 1 to 8.

Figure 1:
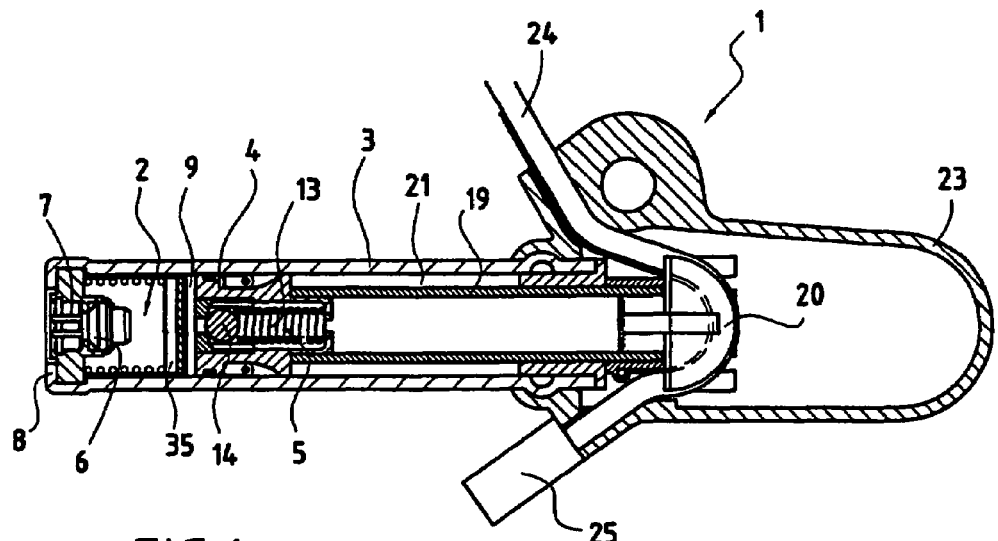
FIG. 1 is a view in longitudinal axial section of a pyrotechnic actuator according to the invention, making use of a ball and a spring, the actuator not having operated.

With reference to FIG. 1, a first embodiment of a pyrotechnic actuator 1 according to the invention comprises a pyrotechnic gas generator 2, a body 3, a piston 4 and a pressure regulator member 5. The pyrotechnic gas generator 2 consists of a pyrotechnic charge 35 which may, for example, be propergol, and consists of an igniter 6 used to initiate the said pyrotechnic charge 35, the said igniter 6 being provided with two pins 7 allowing it to be connected to an external electric source. The body 3 has an end delimited by a circular, transverse and flat face 8, comprising a central circular opening, and the pyrotechnic gas generator 2 is placed at the said end, inside the said body 3 and in a central position, so that the two pins 7 re-emerge in the central opening and are flush with the said face 8. In this manner, the said pins 7 are directly accessible from outside the actuator 1 so as to be connected to an external electric source. The piston 4 is placed inside the body 3 of the actuator 1 and is separated from the pyrotechnic gas generator 2 by a free space 9 used as a combustion chamber 9. The piston 4 and the body 3 are of cylindrical shape and the outer lateral surface of the said piston 4 is in contact with the inner lateral surface of the said body 3, so that the said piston 4 can slide hermetically in the said body 3.

Figure 3:
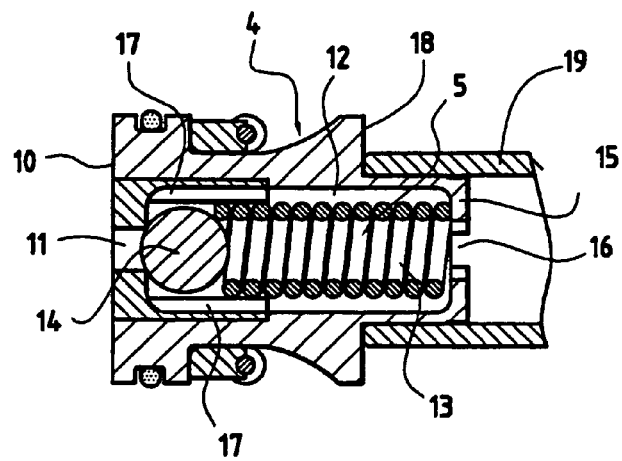
FIG. 3 is a view in enlarged longitudinal axial section of the piston of the actuator of FIG. 1 comprising a ball and a spring.

With reference to FIG. 3, the piston 4 has a front transverse face 10 of circular cross section, the said front face 10 being traversed by a central duct 11 making it possible to place in communication the space serving as a combustion chamber 9 separating the gas generator 2 and the said piston 4, and an inner space 12 of the piston 4 in which the regulator member 5 is housed. The said inner space 12 is delimited by the inner lateral wall of the piston 4, the said wall having one end terminating in the duct 11 and the other end terminating in a circular transverse face 15 furnished with a central opening 16. The regulator member 5 comprises a ball 14 and a prestressed spring 13, these two elements 13, 14 being arranged relative to one another so that the spring 13 presses both against the face 15 of the inner wall of the piston 4 furnished with a central opening 16 and against the ball 14. In this manner, the spring 13 exerts a pushing force on the ball 14 to hold it against the duct 11. Splines 17 that are longitudinal relative to the axis of the piston 4 are made in the inner space 12 of the said piston 4 in which the ball 14 is situated. The length of the said splines 17 represents half the total length of the said inner space 12 in which the ball 14 and the spring 13 are housed.

The piston 4 has a rear face 18 that is opposite the front face 10 and from which emerges a hollow push rod 19 ending in an enlarged, rounded head 20 whose diameter is greater than that of the body 3 of the actuator 1. The diameter of the rod 19 is less than the diameter of the piston 4. The end of the inner space 12 terminating in the circular transverse face 15 furnished with a central opening 16 opens into the inside of the rod 19.

The enlarged head 20 of the rod 19 has two gas discharge ducts 22 connecting the inside of the rod 19 and the space surrounding the said head 20. The free space 9 serving as a combustion chamber and the free space 21 in which the said rod 19 is situated are hermetically separated in the body 3 by the piston 4.

Figure 2:
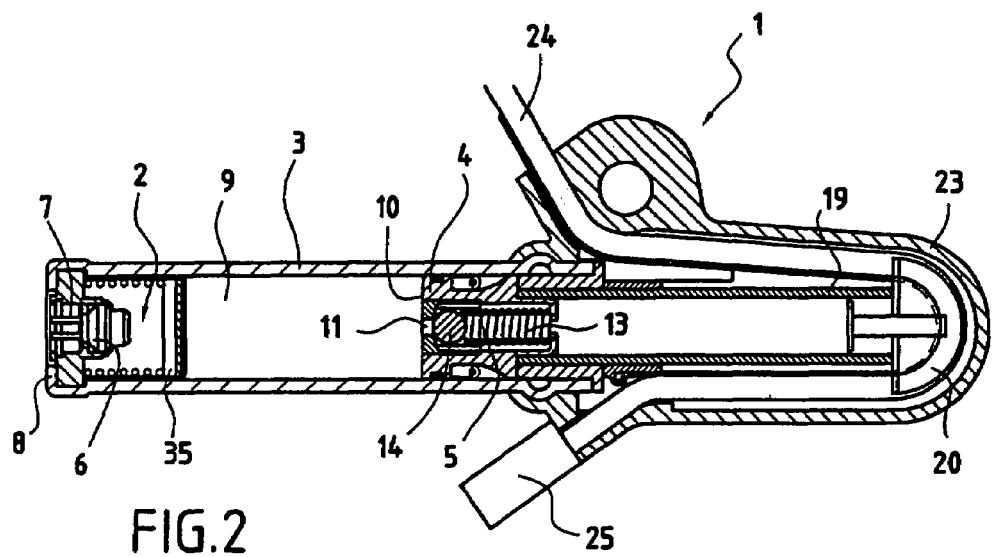
FIG. 2 represents the actuator of FIG. 1 after operation.
Figure 4:
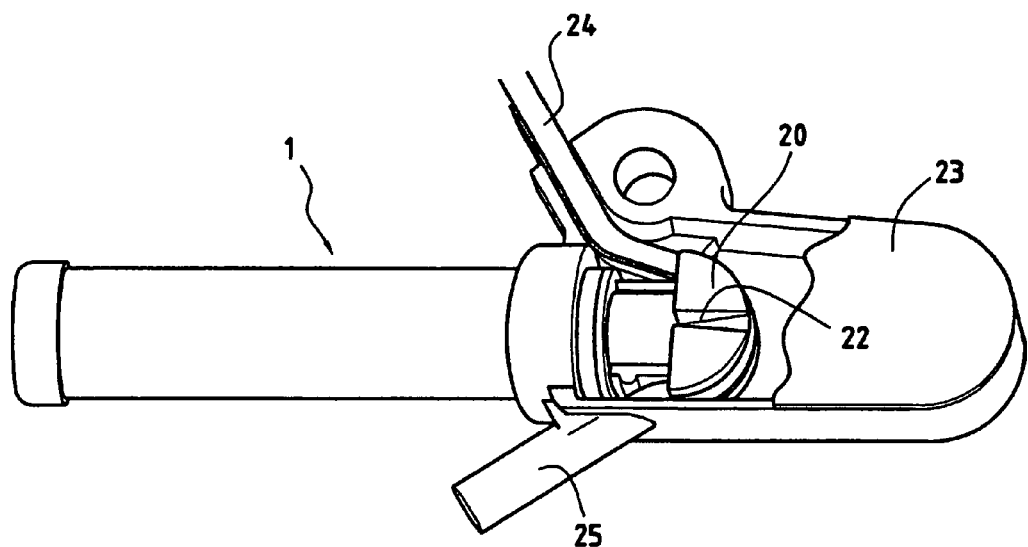
FIG. 4 is a view in partial perspective of the actuator of FIG. 1.

The actuator 1 according to FIGS. 1, 2 and 4 is shown for a use of the belt pretensioner type. The body 3 of the actuator 1 is extended by a casing 23 of elongated shape and having a rounded end. A cable 24 connected to the seat belt passes through the said casing 23 travelling around the enlarged head 20 of the rod 19 of the piston 4. The cable 24 has an enlarged free end 25 butting against the casing 23.

The mode of operation of this first embodiment of a pyrotechnic actuator according to the invention follows the following steps.

With reference to FIGS. 1 and 2, an electric signal triggers the igniter 6 which initiates the pyrotechnic charge 35 whose emitted gases pressurize the space 9 serving as a combustion chamber. The piston 4 then initiates a movement in the body 3 of the actuator 1, while a portion of the gases enters the duct 11 of the said piston 4 and pushes away the ball 14 to open the said duct 11 and thus allow the said gases to escape from the combustion chamber 9 through the inside of the piston 4. In this manner, the pressure of the combustion chamber 9 is regulated by this induced escape of the gases, the said escape being made possible only beyond a certain threshold pressure level regulated by the hardness of the spring 13. The gases that have entered the inner space 12 of the piston invade the inside of the rod 19 and are discharged towards the outside of the actuator 1 via the two discharge ducts 22 made in the enlarged head 20. The inner space of the rod 19 serves as an expansion chamber for the said gases and thus makes it possible to attenuate the noise during the operation of the actuator 1. The piston 4 then performs its stroke at a constant force over the whole length of movement in the body 3.

In the example of the belt pretensioner illustrated in FIGS. 1, 2 and 4, the enlarged head 20 of the piston 4 moves at constant force in the casing 23, causing a traction of the cable 24 which travels around the said head 20. This traction causes the rapid movement of the seat belt because one 25 of the ends of the cable 24 is immobilized against the casing 23. The gases that were inside the rod 19 of the piston 4 are discharged to the inside of the casing 23, making it possible to circumscribe at the perimeter of the said casing 23 the undesirable effects of the combustion products consisting of flames, incandescent particles and gases.

Figure 5:
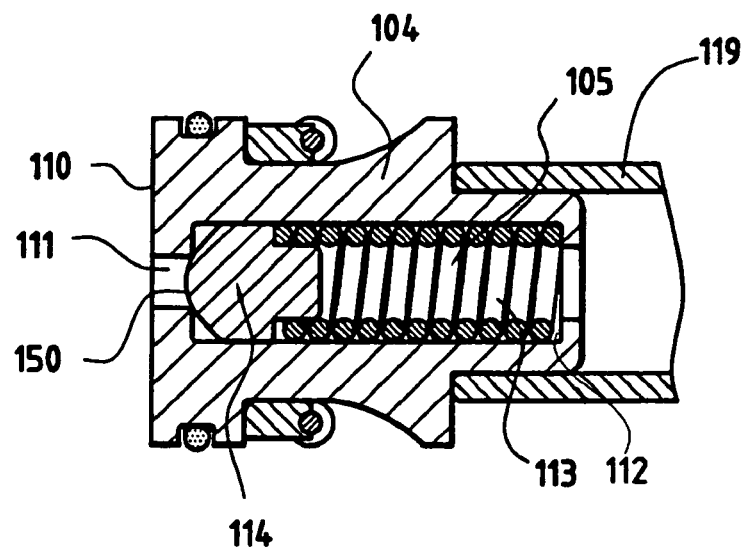
FIG. 5 is a view in longitudinal axial section of the piston of a pyrotechnic actuator according to the invention comprising a star-shaped regulator piston and a spring.
Figure 6:
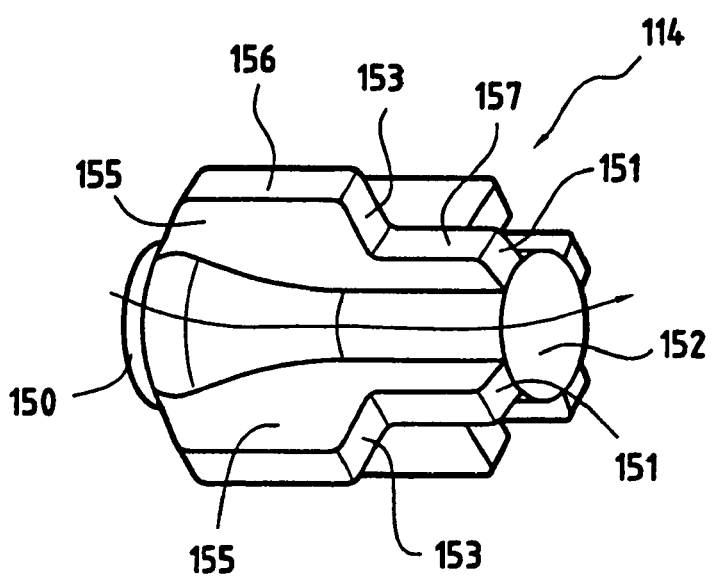
FIG. 6 is a view in perspective of the regulator piston of FIG. 5.

With reference to FIGS. 5 and 6, a second embodiment of a pyrotechnic actuator according to the invention differs from the first embodiment described hereinabove at the pressure regulator member 105, for which the ball has been replaced by a regulator piston 114. The regulator piston 114 comprises a conical segment whose smallest diameter part 150 forms an end of the said regulator piston 114 making it possible to close off the duct 111 of the front face 110 of the piston 104. The regulator piston 114 comprises a central elongated cylindrical body 152 around which are placed longitudinally four elongated fins 155, evenly spaced around the said body. The regulator piston 114 therefore has a cross section in the shape of a cross comprising four branches 151 placed relative to one another so that two successive branches 151 form a right angle between them. Each fin 155 has at the middle of its greatest length, a crank 153 making it possible to distinguish an upstream zone 156 in contact with the conical segment, the said zone 156 corresponding to the part of the fin 155 having a large cross section, and a downstream zone 157 corresponding to the part of the fin 155 of smallest cross section. Each fin is characterized by a length that is its dimension along the longitudinal axis of the regulator piston 114, a height that is its dimension along a radial axis of the regulator piston 114 and a width that is its dimension in a direction that is perpendicular both to the longitudinal axis and to a radial axis of the said regulator piston 114. The height of the cross section of each of the fins 155 at its upstream part 156 is such that the said fin 155 is in contact with the inner lateral wall of the piston 104 of the actuator. The space lying between the said inner lateral wall of the piston 104 and the downstream part 157 of each of the fins 155 is occupied by a part of the spring 113 which butts against the crank 153 of each of the said fins 155.

The mode of operation of this second embodiment of a pyrotechnic actuator according to the invention is identical to that described for the first embodiment.

An electric signal triggers the pyrotechnic gas generator whose emitted gases pressurize the space serving as a combustion chamber. The piston 104 then initiates a movement in the body of the actuator, while a portion of the gases enters the duct 111 of the said piston 104 and pushes away the regulator piston 114 to open the said duct 111, and thus allow the said gases to escape from the combustion chamber via the inside of the piston 104, through the spaces situated between the fins 155 of the regulator piston 114. In this manner, the pressure of the combustion chamber is regulated by this induced escape of the gases, the said escape being made possible only beyond a threshold pressure level regulated by the hardness of the spring 113. The gases that have entered the inner space of the piston 104 invade the inside of the rod 119 and are discharged towards the outside of the actuator via the two discharge ducts made in the enlarged head of the said rod 119. The piston 104 then performs its stroke at a constant force over the whole length of movement in the body.

Figure 7:
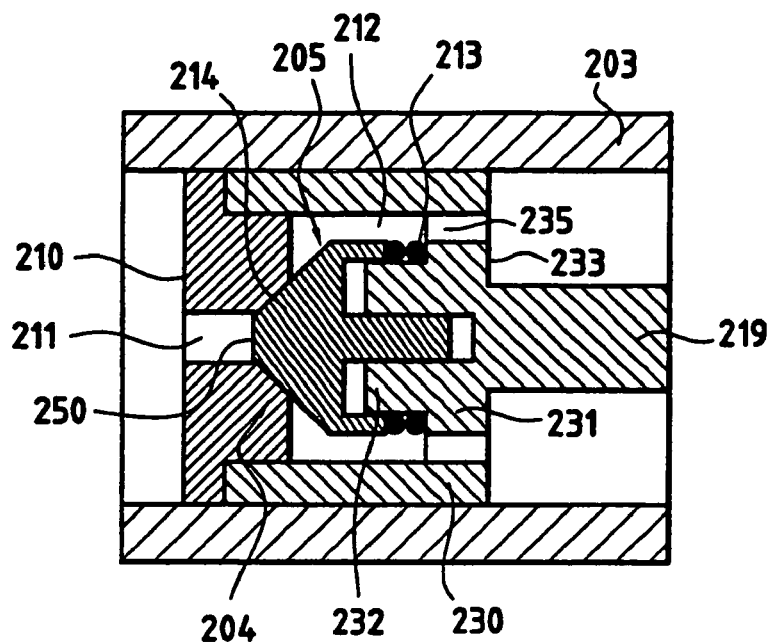
FIG. 7 is a simplified view in longitudinal axial section of the piston of a pyrotechnic actuator according to the invention comprising a conical regulator piston and a spring.
Figure 8:
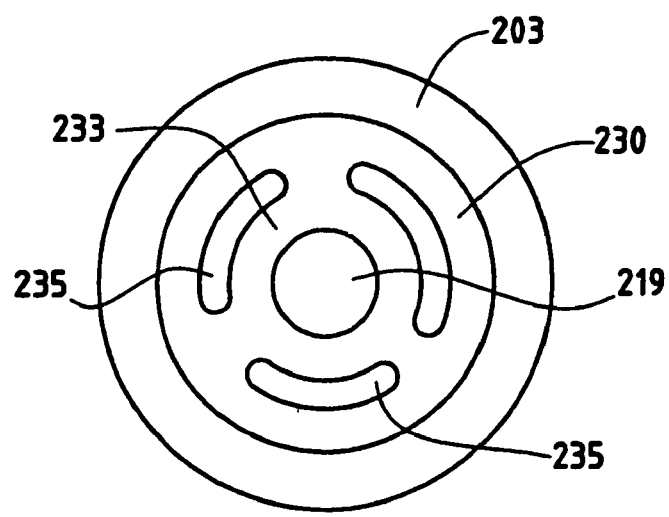
FIG. 8 is a view in lateral axial section of the rear part of the piston of FIG. 7.

With reference to FIGS. 7 and 8, a third embodiment of a pyrotechnic actuator according to the invention differs from the second embodiment described hereinabove, at the pressure regulator member 205 for which the regulator piston 214 has a modified form.

With reference to FIG. 7, the regulator piston 214 comprises a conical segment whose smallest diameter part 250 forms an end of the said regulator piston 214 making it possible to close off the duct 211 of the front face 210 of the piston 204. The piston 204 of the actuator is delimited by a lateral wall 230 whose outer surface is in contact with the inner lateral wall of the body 203 of the actuator. The conical segment of the regulator piston 214 is extended by a hollow cylindrical part whose external diameter is less than the diameter of the inner lateral wall of the piston 204 of the actuator. This difference of diameter makes a free inner space 212. The piston 204 of the actuator has a rod 219 of which one end has an enlarged cylindrical part 231 attached to the inside of the lateral wall 230 of the said piston 204, the said enlarged cylindrical part 231 ending in a smaller diameter cylindrical part 232, the limit between the said cylindrical parts 231, 232 being materialized by a shoulder. The hollow cylindrical part of the regulator piston 214 comes to nest on the smallest diameter part 232 extending the enlarged cylindrical part 231 forming one of the ends of the rod 219. A prestressed spring 213 comes to bear both against the hollow cylindrical part of the regulator piston 214 and against the shoulder.

With reference to FIG. 8, the regulator piston 214 has a rear face 233 corresponding to the flat face of the annular space delimited, on the one hand, by the inner lateral wall of the body 203, and, on the other hand, by the outer lateral surface of the rod 219. The said rear face 233 has three gas discharge slots 235 in the shape of arcs of a circle, the said slots 235 being drawn around one and the same circle. The slots 235 are in continuity with the inner space 212 situated between the lateral wall of the piston 204 and the regulator piston 214.

The mode of operation of this third embodiment of a pyrotechnic actuator according to the invention is identical to that described for the second embodiment.

An electric signal triggers the pyrotechnic gas generator whose emitted gases pressurize the space serving as a combustion chamber. The piston 204 then initiates a movement in the body 203 of the actuator, while a portion of the gases enters the duct 211 of the said piston 204 and pushes away the regulator piston 214 to open the said duct 211 and thus allow the said gases to escape from the combustion chamber via the inside of the piston 204. In this manner, the pressure of the combustion chamber is regulated by this induced escape of the gases, the said escape being made possible only beyond a threshold pressure level regulated by the hardness of the spring 13. The gases that have entered the inner space 212 of the piston 204 are discharged through the slots 235 of the rear face 233 of the said piston 204, into the part of the body 203 of the actuator comprising the rod 219. The piston 204 then performs its stroke at a constant force over the whole length of movement in the body 203.

The invention claimed is:

1. A constant force pyrotechnic actuator comprising a pyrotechnic gas generator, a body, a piston capable of moving in said body under the effect of the gases emitted by the generator, and a pressure regulator member situated inside the piston, said piston having a front face traversed by a duct making it possible to place in communication the space separating the gas generator and said piston, and an inner space in which the regulator member is housed, wherein the piston is extended by a hollow push rod terminating in an enlarged head, said head having gas discharge ducts, and the inner space of said rod is in communication with the inner space of the piston in which the regulator member is housed.

2. The actuator according to claim 1, wherein the regulator member comprises a stopper in contact with a prestressed member.

3. The actuator according to claim 2, wherein the piston and the stopper are coaxial and can move independently of one another in the same direction along the body.

4. The actuator according to claim 2, wherein the front face of the piston is transverse relative to the axis of the body of the actuator, and the prestressed member exerts a pushing force on the stopper to hold it against the duct.

5. The actuator according to claim 1, wherein the prestressed member consists of a coil spring.

6. The actuator according to claim 5, wherein the stopper consists of a ball.

7. The actuator according to claim 6, wherein longitudinal splines are made inside the piston to allow the gases, once they have pushed away the ball, to pass through said piston.

8. The actuator according to claim 5, wherein the stopper is a regulator piston having a conical segment whose smallest diameter part forms one end of said stopper making it possible to close oft the duct of the front face of the piston.

9. The actuator according to claim 8, wherein the regulator piston has a central body around which a plurality of fins is placed.

10. The actuator according to claim 9, wherein the regulator piston has four fins evenly spaced around said body.

11. The actuator according to claim 1, wherein the gas generator comprises a pyrotechnic charge and a system for igniting said charge.

* * * * *